United States Patent
Sato

(10) Patent No.: US 10,209,370 B2
(45) Date of Patent: Feb. 19, 2019

(54) RADIATION IMAGING APPARATUS AND RADIATION IMAGING SYSTEM

(71) Applicant: CANON KABUSHIKI KAISHA, Tokyo (JP)

(72) Inventor: Eriko Sato, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/792,008

(22) Filed: Oct. 24, 2017

(65) Prior Publication Data
US 2018/0149759 A1 May 31, 2018

(30) Foreign Application Priority Data
Nov. 25, 2016 (JP) .................... 2016-229189

(51) Int. Cl.
*G01T 1/00* (2006.01)
*G01T 1/175* (2006.01)
*G01T 1/24* (2006.01)

(52) U.S. Cl.
CPC .............. *G01T 1/175* (2013.01); *G01T 1/247* (2013.01)

(58) Field of Classification Search
CPC .... G01J 9/00; G01J 1/4228; G01J 3/02; G01J 3/2803; G01J 3/36
See application file for complete search history.

(56) References Cited

U.S. PATENT DOCUMENTS

2016/0047920 A1* 2/2016 Yokoyama ............. G01N 23/04
378/62

FOREIGN PATENT DOCUMENTS

JP 2004535104 A 11/2004

* cited by examiner

*Primary Examiner* — David Porta
*Assistant Examiner* — Mamadou Faye
(74) *Attorney, Agent, or Firm* — Canon U.S.A., Inc. IP Division

(57) ABSTRACT

An apparatus includes a controller and a power supply circuit. The controller performs first control for resetting a plurality of sensors before start of radiation irradiation, second control to accumulate charges in the plurality of sensors after the start of the radiation irradiation, and third control to output the signal read out from the plurality of sensors after the second control.

14 Claims, 7 Drawing Sheets

$V_{IN}$ = 12 V, $I_{LOAD}$ = 2 A
FRONT PAGE APPLICATION $V_{IN}$ = 12 V, $I_{LOAD}$ = 20 mA
FRONT PAGE APPLICATION

RADIATION IMAGING APPARATUS AND RADIATION IMAGING SYSTEM

BACKGROUND OF THE INVENTION

Field of the Invention

The aspect of the embodiments relates to a radiation imaging apparatus and a radiation imaging system.

Description of the Related Art

As discussed in, for example, Japanese Unexamined Patent Application Publication (Translation of PCT Application) No. 2004-535104, a radiation imaging apparatus includes a plurality of sensors configured to detect radiation, a readout circuit configured to read out signals of the respective sensors, and a power supply circuit configured to generate a voltage for the readout circuit with use of a power supply voltage. Examples of the power supply circuit includes a switching power supply circuit that stabilizes a value of an output voltage. Such a power supply circuit includes a voltage regulator (i.e., a switching regulator). A clock signal can be used for switching control of the voltage regulator.

After activation of the radiation imaging apparatus, there is a period in which imaging is not performed (i.e., a period before start of imaging, or a period after imaging is finished until next imaging is started). During the period, the radiation imaging apparatus is not shut down but is maintained in a waiting state (a sleep mode) so that the radiation imaging apparatus can return to an imaging performable state (a standby mode) in a relatively short time. In the waiting state, the power consumption of the radiation imaging apparatus is reduced.

In the above-described configuration in which the switching control of the voltage regulator is performed, an intermittent clock signal may be used to perform the switching control as one method for achieving reduction in power consumption in the waiting state. More specifically, in the driving method, continuous generation of clock signals for a predetermined period (for example, a first period) and stop of generation of the clock signals for a predetermined period (for example, a second period) are repeated. In other words, in the driving method, performing of the switching control for the first period and stop of the switching control for the second period are repeated.

Meanwhile, according to the driving method, voltage fluctuation due to the intermittent clock signal occurs in the output voltage of the power supply circuit. This may cause noise of a potential of a power supply line or noise of a signal value of a signal line in the radiation imaging apparatus. The noise may cause, for example, malfunction of the radiation imaging apparatus. Further, because, for example, the noise produces an offset component varied with time in the signals of the respective sensors, the noise may cause deterioration of image quality. Accordingly, when the above-described driving method is used, the radiation imaging apparatus is to have the configuration in consideration of both of reduction in power consumption and suppression in voltage fluctuation.

SUMMARY OF THE INVENTION

According to an aspect of the embodiments, an apparatus includes a sensor array in which a plurality of sensors each configured to detect radiation is arranged, a readout circuit configured to read out a signal from the plurality of sensors, an output circuit configured to output the signal, a driving unit configured to drive the plurality of sensors, a controller configured to perform first control for resetting the plurality of sensors by causing the driving unit to drive the plurality of sensors before start of radiation irradiation, second control for causing the driving unit to accumulate charges in the plurality of sensors after the start of the radiation irradiation, and third control for causing the driving unit to drive the plurality of sensors to cause the output circuit to output the signal after the second control, and a power supply circuit including a first switching voltage regulator that generates a voltage for the readout circuit and a second switching voltage regulator that generates a voltage for the output circuit, wherein the second voltage regulator generates the voltage for the output circuit based on a first clock signal provided from the controller in the third control, and generates the voltage for the output circuit based on a second clock signal in the first control, the second clock signal being lower in power consumption of the second voltage regulator than the first clock signal, and wherein the first voltage regulator generates the voltage for the readout circuit based on a third clock signal provided from the controller in the first control, the second control, and the third control.

Further features of the disclosure will become apparent from the following description of exemplary embodiments with reference to the attached drawings.

DESCRIPTION OF THE EMBODIMENTS

Figure 1:
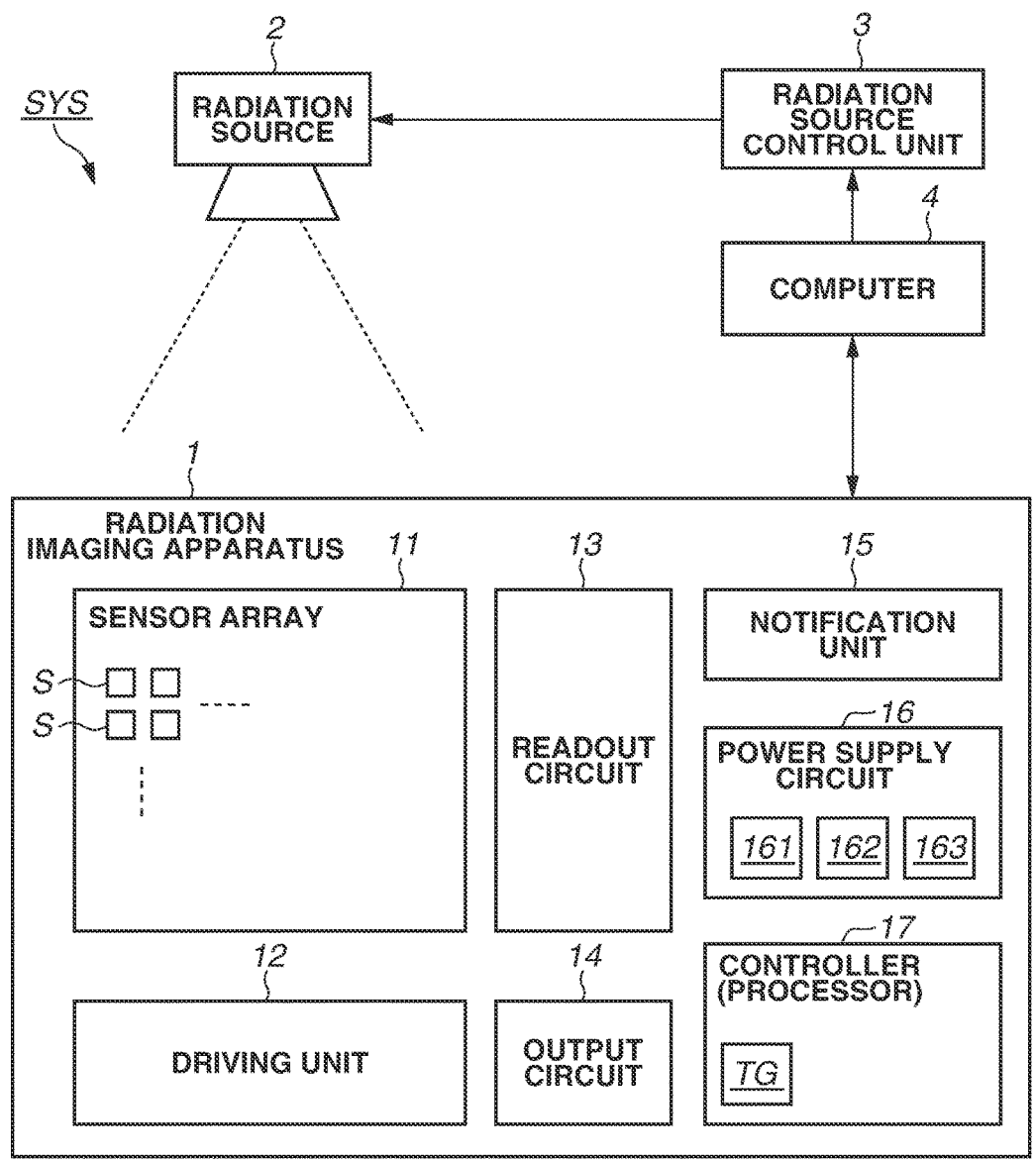
FIG. 1 is a diagram illustrating an example of a system configuration of a radiation imaging system.

Various exemplary embodiments of the disclosure are described below with reference to accompanying drawings. All drawings are merely illustrated for description of a structure or a configuration, and may not reflect actual dimensions of respective components. In addition, in all drawings, the same members or components are denoted by the same reference numerals, and description of overlapped contents is omitted in the following description.

A first exemplary embodiment will be described below. FIG. 1 illustrates a system configuration of a radiation imaging system SYS. The radiation imaging system SYS includes a radiation imaging apparatus 1, a radiation source 2, a radiation source control unit 3, and a computer 4. The computer 4 communicates with the radiation imaging apparatus 1 to control the radiation imaging apparatus 1, and drives the radiation source 2 via the radiation source control unit 3, based on an imaging condition input by a user such as a physician or a radiological technologist. The radiation source generates radiation (typically X-rays, but alpha rays, beta rays, etc. may be used) in response to a control signal from the radiation source control unit 3.

The radiation imaging apparatus 1 includes a sensor array 11, a driving unit 12, a readout circuit 13, an output circuit 14, a notification unit 15, a power supply circuit 16, and a controller 17. The sensor array 11 includes a plurality of sensors S each detecting radiation. The plurality of sensors S is arranged in a matrix (so as to form a plurality of rows and a plurality of columns). Each of the sensors may be referred to as a "pixel" and the sensor array may be referred to as a "pixel array".

The driving unit 12 is a vertical scanning circuit that drives the plurality of sensors S on a row basis, and may include, for example, a shift register. For example, the driving unit 12 resets (initializes) the sensors S and causes the sensors S to output respective sensor signals. Although the detail is described below, the readout circuit 13 may include, for example, an amplifier, and reads out the sensor signals, on a column basis, from the respective sensors S driven by the driving unit 12. The output circuit 14 outputs the sensor signals read out by the readout circuit 13, as image data of one frame. The notification unit 15 is, for example, a light source or a display, and notifies a user of a state (for example, an operation mode) of the apparatus 1.

The power supply circuit 16 uses a power supply voltage supplied from outside to generate a voltage to be supplied to the components (such as the readout circuit 13) in the apparatus 1. More specifically, the components in the apparatus 1 may include one or more integrated circuit chips (IC chips (semiconductor chips)), and the power supply circuit 16 is a power supply IC that generates the voltage to be supplied to each of the IC chips. The power supply circuit 16 typically includes an AC-DC converter and one or more DC-DC converters. Although the power supply circuit 16 is illustrated as a single component in FIG. 1, the power supply circuit 16 may include a plurality of power supply ICs. In the present exemplary embodiment, the power supply circuit 16 includes a first voltage regulator 161 and a second voltage regulator 162 of a switching type used in the DC-DC converters, and accordingly generates a desired constant voltage. The voltage regulator may also be referred to as a switching regulator.

Although the detail is described below, the power supply circuit 16 further includes a signal generation unit 163 that generates clock signals to perform switching control of the voltage regulators 161 and 162. Although a single signal generation unit 163 is illustrated here for simplification of description, the signal generation unit may be provided for each of the voltage regulators 161 and 162. Further, although the signal generation unit 163 is described as a component separated from the voltage regulators 161 and 162 here for simplification of description, the signal generation unit 163 may be included in each of the voltage regulators 161 and 162. In this case, each of the voltage regulators 161 and 162 generates a clock signal by itself.

The controller 17 includes a timing generator TG and generates a control signal to perform synchronization control of the components in the apparatus 1 based on a reference clock signal. The controller 17 may function as a processor, and may perform data processing such as correction processing on, for example, image data read out by the readout circuit 13 and the output circuit 14.

The controller 17 may be, for example, a programmable logic device (PLD) such as an integrated circuit and a device (for example, field programmable gate array (FPGA)) in which the functions described in the present specification are programmable, an arithmetic device to achieve each function, such as a micro processing unit (MPU) and a digital signal processor (DSP), or a dedicated integrated circuit (such as an application specific integrated circuit (ASIC)). Alternatively, each function may be realized on software by a personal computer that includes a central processing unit (CPU) and a memory and holds a predetermined program, etc. In other words, it is sufficient for the function of the controller 17 to be realized by hardware and/or software.

The configuration example of the radiation imaging system SYS is not limited to the present example, and the functions of some of the components configuring the system SYS may be included in the other component, or a component having other function may be added. For example, some of the functions of the radiation imaging apparatus 1 may be realized by the computer 4 and vice versa. For example, although the computer 4 and the controller 17 are separately illustrated in FIG. 1, some or all of the functions may be realized by a single component.

Figure 2:
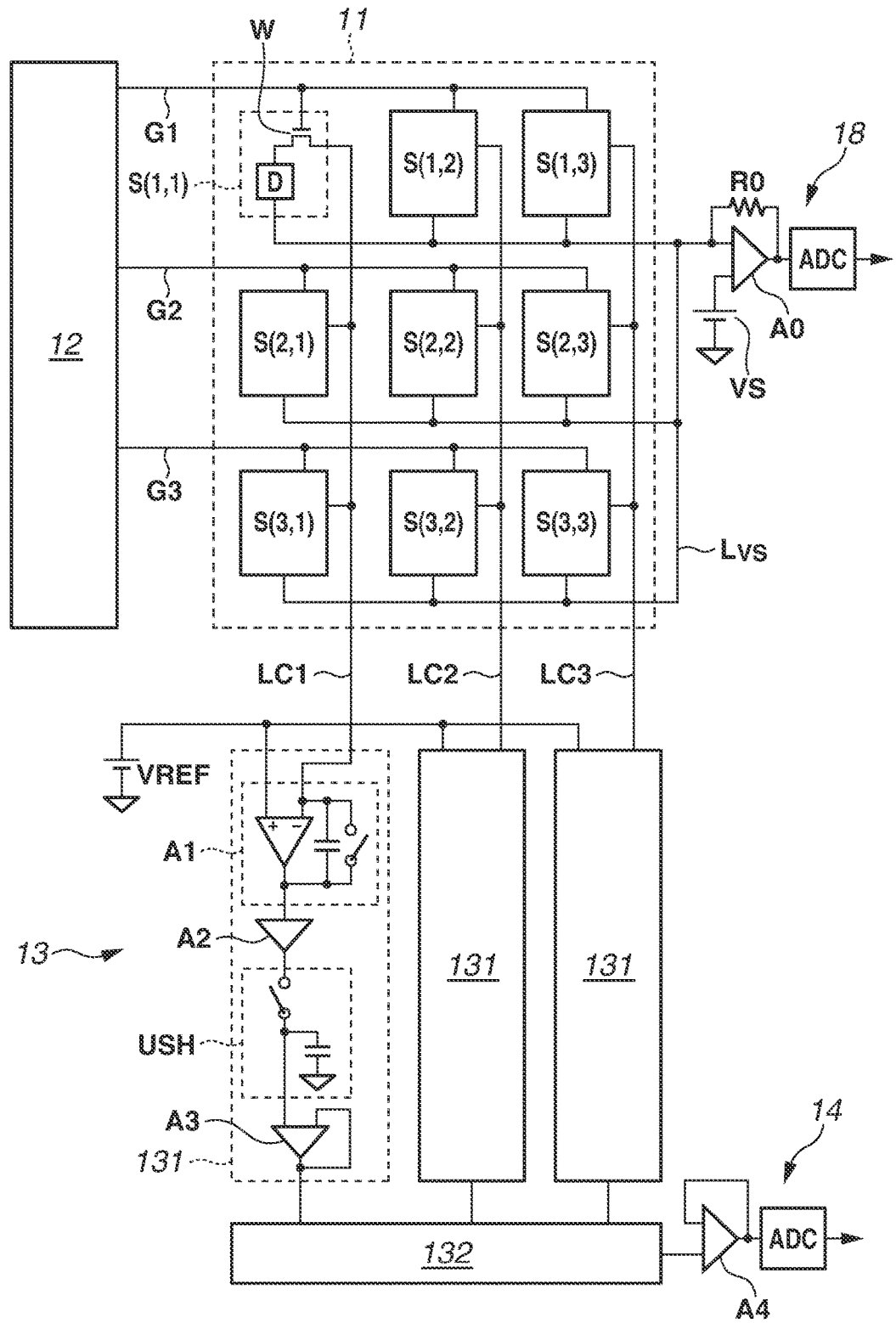
FIG. 2 is a diagram illustrating an example of a configuration of a radiation imaging apparatus.

FIG. 2 illustrates configurations of the sensor array 11, the driving unit 12, the readout circuit 13, and the output circuit 14 in the configuration of the radiation imaging apparatus 1. The sensor array in which the plurality of sensors S is arranged in three rows X three columns is illustrated here for simplification of the description. The numbers of actual rows and columns are larger than the number in the present example, and for example, the sensors S are arranged in about 3000 rows×about 3000 columns in the sensor array 11 having 17 inches. In FIG. 2, the sensor S located at the m-th row and the n-th column is denoted by "S(m, n)" (for example, the sensor S(1, 1) is located at the first row and the first column in the sensor array 11).

In the present exemplary embodiment, a scintillator (not illustrated) that convers radiation into light is disposed above the sensor array 11, and each of the sensors S outputs the sensor signal based on the light (scintillation light) converted by the scintillator. More specifically, the sensor S(1, 1) includes a detection device D and a switch device W connected to the detection device D (the other sensors such as the sensor S(1, 2) similarly includes the devices). Although a metal-insulator-semiconductor (MIS) sensor is used for the detection device D in the present exemplary embodiment, other photoelectric conversion device such as a PIN sensor may be used. In addition, although a thin film transistor is used for the switch device W, a transistor or a switch device having the other structure may be used. Further, the detection device D in each of the sensors S is connected, on a side opposite to the switch device W, to a bias line $L_{VS}$ that supplies a reference voltage (in this example, a ground voltage) to the sensor array 11.

In the sensor array 11, control lines G1 to G3 respectively corresponding to first to third rows are disposed, and column signal lines LC1 to LC3 respectively corresponding to first to third columns are disposed. The driving unit 12 drives the sensors S on a row basis through the control lines G1 to G3. For example, control terminals (gate electrodes) of the switch devices W of the respective sensors S(1, 1), S(1, 2), and S(1, 3) are connected to the control line G1. The driving unit 12 activates the control signal of the control line G1 to turn on (conductive state) the switch devices W of the respective sensors S(1, 1), S(1, 2), and S(1, 3). As a result, the sensor signal corresponding to an amount of charges of the detection device D is output from each of the sensors S(1, 1), S(1, 2), and S(1, 3) to corresponding column signal lines LC1, LC2, and LC3.

In the following description, each of the control lines G1 to G3 is simply referred to as a "control line G" when the control lines G1 to G3 are not discriminated, and each of the column signal lines LC1 to LC3 is simply referred to as a "column signal line LC" when the column signal lines LC1 to LC3 are not discriminated.

Figure 3:
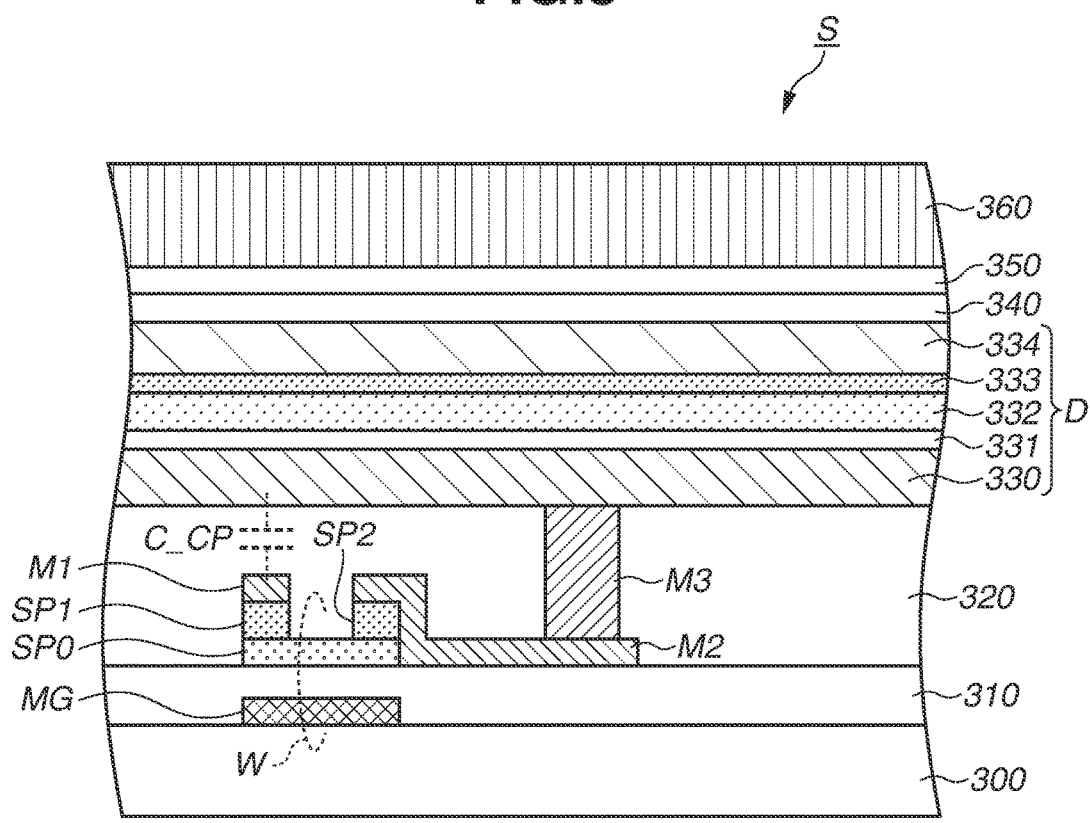
FIG. 3 is a diagram illustrating an example of a structure of a sensor.

FIG. 3 is a schematic diagram illustrating a structure of the sensor S. The switch device W as the thin film transistor is disposed on, for example, an insulating substrate 300 (such as a glass substrate), and is connected to the detection device D that is disposed on the switch device W with an insulating layer 320 in between. An electrode MG disposed on a top surface of the substrate 300 is a gate electrode of the thin film transistor. A semiconductor part SP0 is disposed on the gate electrode MG with an insulating film 310 in between, and the semiconductor part SP0 forms a channel of the thin film transistor. A portion of the insulating film 310 forms a gate insulating film. A semiconductor part SP1 doped with, for example, N-type impurity is disposed on one end of the semiconductor part SP0. The semiconductor part SP1 forms a source of the thin film transistor, and is connected to an electrode M1 that is a portion of the column signal line LC. Further, a semiconductor part SP2 doped with the same impurity is disposed on the other end of the semiconductor part SP0. The semiconductor part SP2 forms a drain of the thin film transistor and is connected to the detection device D via an electrode M2 and a plug M3. The semiconductor parts SP0 to SP2 may be made of, for example, amorphous silicon.

The detection device D includes, for example, layers 330 to 334 that are disposed in order from lower side to upper side in FIG. 3. The layer 330 is an electroconductive layer forming a lower electrode of the detection device D and is in contact with the plug M3. The layer 331 is an insulating layer. The layer 332 is a semiconductor layer. The layer 333 is a high-concentration impurity semiconductor layer doped with, for example, N-type impurity. The layer 334 is an electroconductive layer forming an upper electrode of the detection device D, and may be made of a material having transparency and electroconductivity (for example, indium tin oxide (ITO)). A scintillator 360 is disposed on the detection device D with a protection layer 340 and an adhesive layer 350 in between.

A gadolinium-based material such as gadolinium oxide sulfate (GOS) and a material such as cesium iodide (CsI) may be used for the scintillator 360. In the present exemplary embodiment, the detection device D detects scintillation light from the scintillator 360, and the detection is equivalent to detection of radiation. The scintillator 360 and the detection device D may be collectively referred to as a conversion device that converts the radiation into an electric signal, or the like.

In the present exemplary embodiment, the method in which radiation is converted into light and the light is then converted into an electric signal (indirect conversion method) is exemplified. A method of directly converting radiation into an electric signal (direct conversion method) may be adopted in another exemplary embodiment. In the direct conversion method, a material such as amorphous selenium, gallium arsenide, gallium phosphorus, lead iodide, mercury iodide, CdTe, and CdZnTe may be used for the detection device D.

The electrode M1 forming a portion of the column signal line LC may be substantially overlapped with the detection device D (or a region of one sensor S) in a planar view (in a planar view with respect to the top surface of the substrate 300 or a plane parallel to the top surface of the substrate 300). This makes it possible to increase a size of the detection device D and/or an effective region of the sensor S in a planar view. Meanwhile, as illustrated by a dashed line in FIG. 3, a capacity component C_CP is formed between the electroconductive layer 330 forming the lower electrode (and incidentally, each of the plug M3, the electrode M2, and the semiconductor part SP2 each having the same potential) and the electrode M1. It is noted that, accordingly, potential variation of the electroconductive layer 330 is transmitted to the electrode M1 by capacitive coupling of the capacity component C_CP even when the switch device W is off (in a non-conductive state).

Referring back to FIG. 2, the bias line $L_{VS}$ is connected to a detection unit 18 that detects start of radiation irradiation, and the detection unit 18 detects start of the radiation irradiation based on the electric signal (in this example, variation of a current amount) of the bias line $L_{VS}$. The detection unit 18 includes an amplifier A0, a feedback resistor R0, and an analog-digital converter (AD converter (ADC)). One of input terminals of the amplifier A0 is connected to the bias line $L_{VS}$, and the other input terminal of the amplifier A0 is fixed at a voltage VS. One of ends of the feedback resistor R0 is connected to the one input terminal of the amplifier A0, and the other end is connected to an output terminal of the amplifier A0. The detection unit 18 performs analog-digital conversion (AD conversion) on an output of the amplifier A0 by the AD converter, and outputs a conversion result to the controller 17 as a detection signal indicating whether the radiation irradiation has been started. The detection unit 18 may have the other configuration that detects the electric signal of the bias line $L_{VS}$, and may include, for example, a current-voltage converter.

The readout circuit 13 includes a signal processing unit 131 and a horizontal transfer unit 132. In the following description of the readout circuit 13, not only the signal directly output from the sensor S but also the signal thereafter processed in the readout circuit 13 are referred to as "sensor signal" for simplification of description.

The signal processing unit 131 is disposed in each of the first to third columns, and includes an integrating amplifier A1, a variable amplifier A2, a sample-and-hold circuit USH, and a buffer circuit A3. Although a specific configuration of the signal processing unit 131 is illustrated only for the first column in FIG. 2, the signal processing unit 131 in the other columns has a similar configuration.

As illustrated in FIG. 2, the integrating amplifier A1 includes an operation amplifier, a feedback capacitor, and a reset switch. The feedback capacitor is disposed in a path between an inversion input terminal (a "−" terminal in FIG. 2) and an output terminal of the operation amplifier. The reset switch is disposed in parallel to the feedback capacitor. A reference voltage VREF is supplied to a non-inversion input terminal (a "+" terminal in FIG. 2) of the operation amplifier. The sensor signal output from the sensor S (more specifically, voltage fluctuation of the column signal line LC) is amplified by the integrating amplifier A1 while the reset switch is off. In addition, when the reset switch is turned on, the integrating amplifier A1 is reset.

The sensor signal amplified by the integrating amplifier A1 is further amplified by the variable amplifier A2 with a predetermined gain, and the amplified sensor signal is then sampled by the sample-and-hold circuit USH. The sample-and-hold circuit USH includes a sampling switch and a sampling capacitor connected to the sampling switch. When the sampling switch is turned on, the sampling capacitor is charged to set a voltage corresponding to the sensor signal (sampling). When the sampling switch is turned off, the voltage is retained in the sampling capacitor to fix the voltage (holding).

The sensor signal sampled in such a manner is horizontally transferred from the horizontal transfer unit 132 via the buffer circuit A3. The horizontal transfer unit 132 may include, for example, a multiplexer and a shift resistor. The horizontal transfer unit 132 sequentially selects an objective column to horizontally transfer the sensor signals read out on a column basis to the output circuit 14 in order.

The output circuit 14 includes a buffer circuit A4 and an AD converter, amplifies the horizontally-transferred sensor signals by the buffer circuit A4, performs the AD conversion on the amplified sensor signals by the AD converter, and outputs the resultant signals as image data to the controller 17.

Referring back to FIG. 1, the power supply circuit 16 includes the first voltage regulator 161 that generates a voltage for the readout circuit 13, and the second voltage regulator 162 that generates a voltage for the output circuit 14.

The second voltage regulator 162 performs switching based on a clock signal CLK1 (a first clock signal) provided from the timing generator TG, thereby stabilizing the output voltage. In other words, the power supply circuit 16 performs the switching control of the second voltage regulator 162 based on the clock signal CLK1, thereby generating the voltage for the output circuit 14. In addition, as described above, the power supply circuit 16 further includes the signal generation unit 163. The power supply circuit 16 generates a clock signal CLK2 (a second clock signal) for switching control of the second voltage regulator 162 by the signal generation unit 163.

In other words, the clock signal CLK1 is supplied from the timing generator TG, and the clock signal CLK2 is generated by the signal generation unit 163. The second voltage regulator 162 performs switching based on the clock signal CLK1 to stabilize the output voltage as well as performs switching based on the clock signal CLK2 to stabilize the output voltage.

The first voltage regulator 161 performs switching based on a clock signal CLK3 (a third clock signal) provided from the timing generator TG, thereby stabilizing the output voltage. In other words, the power supply circuit 16 performs switching control of the first voltage regulator 161 based on the clock signal CLK3, thereby generating the voltage for the readout circuit 13. Further, the power supply circuit 16 generates a clock signal CLK4 (a fourth clock signal) for switching control of the first voltage regulator 161 by the signal generation unit 163.

In other words, the clock signal CLK3 is supplied from the timing generator TG, and the clock signal CLK4 is generated by the signal generation unit 163. The first voltage regulator 161 performs switching based on the clock signal CLK3 to stabilize the output voltage as well as performs switching based on the clock signal CLK4 to stabilize the output voltage.

In summary, one of the two clock signals CLK3 and CLK4 is selectively used for the switching control of the first voltage regulator 161, and the first voltage regulator 161 includes two operation modes different in method of generating a supply voltage from each other. Similarly, one of the two clock signals CLK1 and CLK2 is selectively used for the switching control of the second voltage regulator 162, and the second voltage regulator 162 includes two operation modes different in method of generating a supply voltage from each other.

The two operation modes different from each other of the second voltage regulator 162 are described as an example below with reference to FIGS. 4A and 4B. In the present exemplary embodiment, LT3690 (a switching regulator available from Linear Technology Corporation) is adopted as the second voltage regulator 162.

Figure 4A:
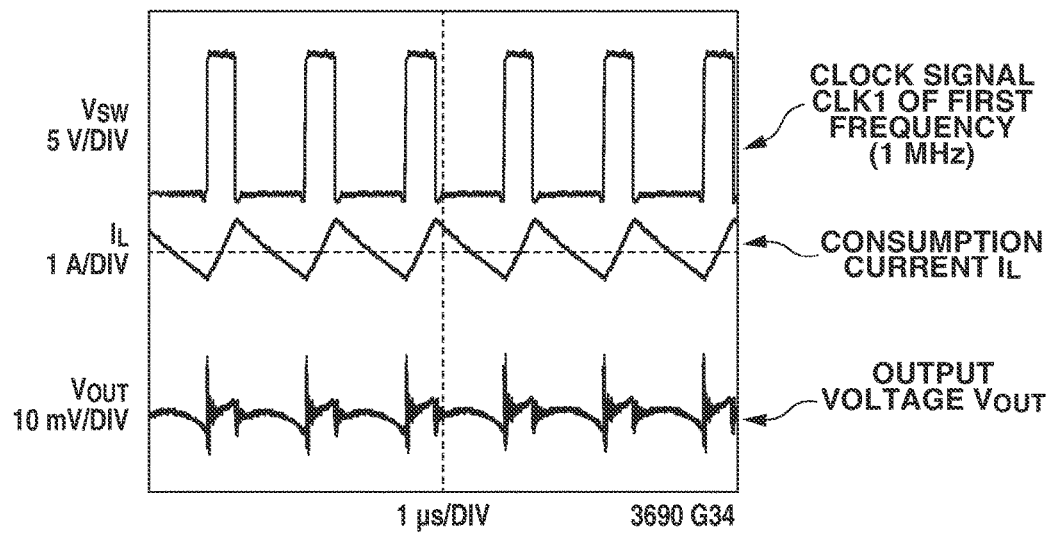
FIGS. 4A and 4B are diagrams illustrating waveforms of various kinds of signals, voltages, and the like in respective operation modes.

FIG. 4A illustrates measurement results of an output voltage $V_{OUT}$ and a consumption current $I_L$ of the second voltage regulator 162 based on the clock signal CLK1. In this example, the clock signal CLK1 has a frequency of about 1 MHz. FIG. 4B illustrates measurement results of the output voltage $V_{OUT}$ and the consumption current $I_L$ of the second voltage regulator 162 based on the clock signal CLK2. In this example, the clock signal CLK2 has a frequency of about 800 kHz that is lower than the frequency (about 1 MHz) of the clock signal CLK1. In addition, as illustrated in FIG. 4B, the clock signal CLK2 is intermittently generated by the signal generation unit 163. Further, as illustrated in FIG. 4B, an amplitude of the clock signal CLK2 is decreased with time in the present exemplary embodiment.

The term "intermittently" used in the present exemplary embodiment indicates a form in which generation of the clock signal CLK2 for a predetermined period and stop of generation of the clock signal CLK2 for a period longer than the period of the clock signal CLK2 are alternately performed. The intermittent clock signal may be referred to as a "burst clock", or the like. As the other form, activation and inactivation of the switching control may be alternately performed while continuing generation of the clock signal CLK2. In other words, in the operation mode using the clock signal CLK2 of FIG. 4B, the power supply circuit 16 alternately performs operation of repeating the switching of the second voltage regulator 162 and operation of stopping the switching. The clock signal CLK2 is intermittently generated as described above. Similarly, the phrase "generates the clock signal CLK2", etc. in the following description intends to "intermittently" generate the clock signal CLK2. In other words, in the following description, the simple representation of the "clock signal CLK2" indicates "intermittently-generated clock signal CLK2".

Figure 4B:
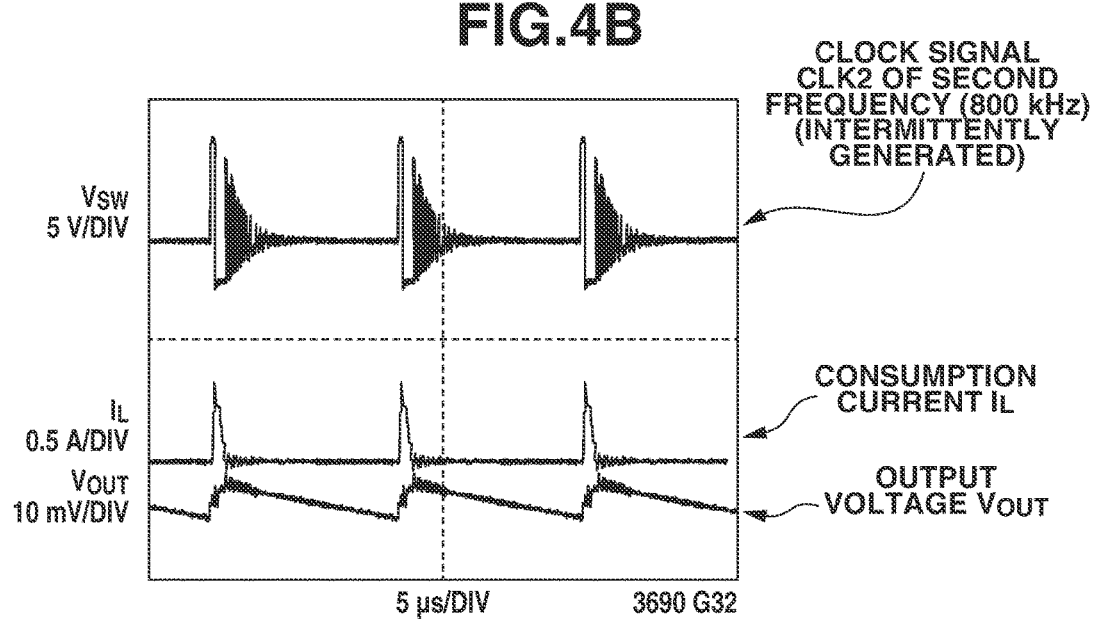

As is known from a comparison between the measurement results of FIG. 4A and the measurement results of FIG. 4B, the consumption current $I_L$ of FIG. 4B is about one-hundredth of the consumption current $I_L$ of FIG. 4A. Accordingly, the power consumption when the clock signal CLK2 is used is reduced as compared with the power consumption when the clock signal CLK1 is used. In contrast, the output voltage $V_{OUT}$ of FIG. 4B is largely fluctuated from a target value as compared with the output voltage $V_{OUT}$ of FIG. 4A. The fluctuation of the output voltage $V_{OUT}$ may be possibly mixed as a noise to the sensor signal by the capacitive coupling of the capacity component C_CP (see FIG. 3). In addition, in the configuration of the present exemplary embodiment, the fluctuation of the output voltage $V_{OUT}$ may be possibly mixed as a noise to the potential of the bias line $L_{VS}$, which may cause false detection of the detection unit 18. In other words, the power consumption and the voltage fluctuation (noise) have trade-off relationship between when the clock signal CLK1 is used and when the clock signal CLK2 is used. Accordingly, a method of driving the apparatus 1 in consideration of both of reduction in power consumption and suppression in voltage fluctuation is provided.

The above-described contents of the two operation modes of the second voltage regulator 162 are applicable to the first voltage regulator 161. In this case, the clock signal CLK3 corresponds to the clock signal CLK1, and the clock signal CLK4 corresponds to the clock signal CLK2. The clock signal CLK4 has a frequency lower than the frequency of the clock signal CLK3. The frequencies of the clock signals CLK3 and CLK4 may be respectively equal to or different from the frequencies of the clock signals CLK1 and CLK2.

Figure 5:
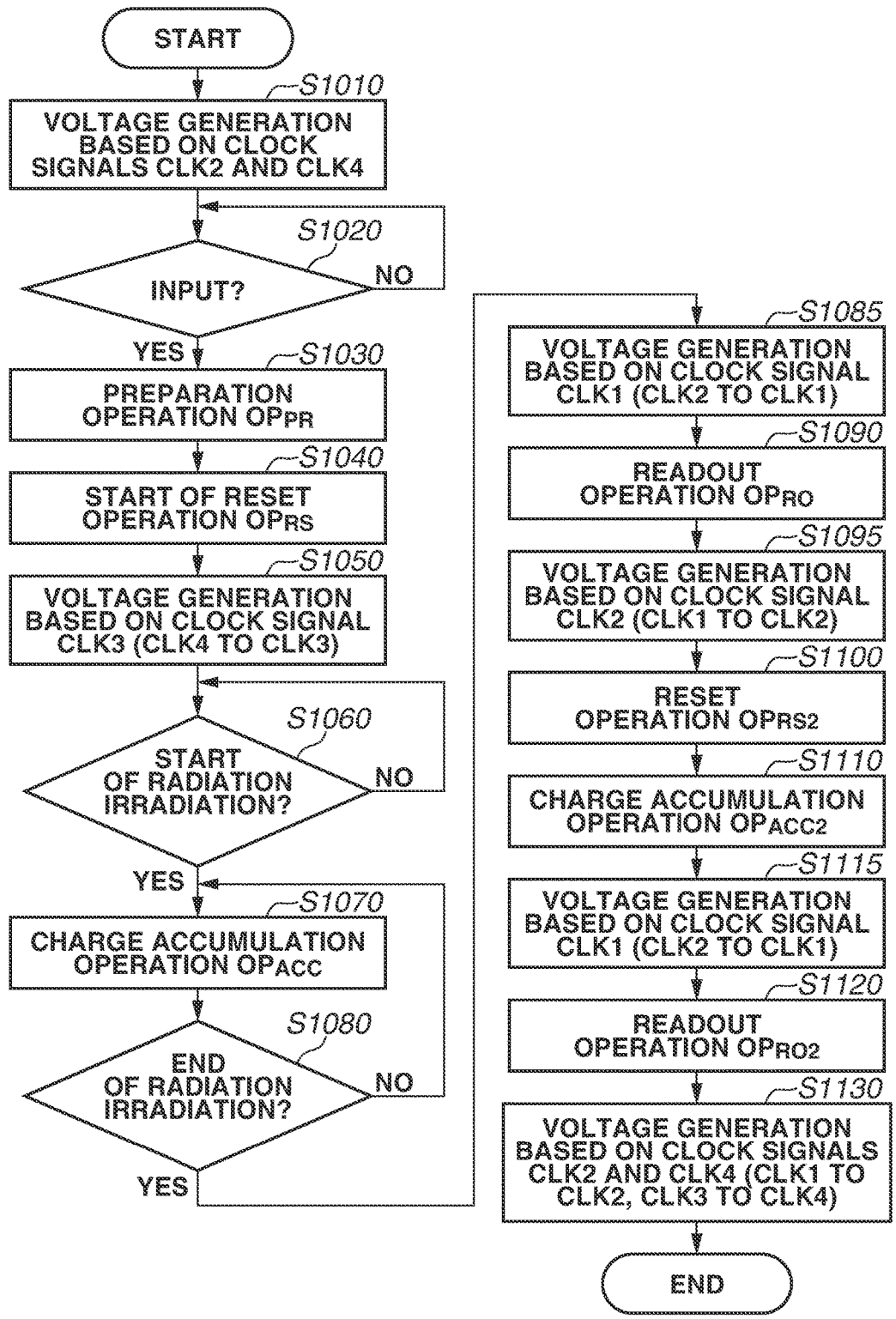
FIG. 5 is a flowchart illustrating an example of a method of driving the radiation imaging apparatus.

FIG. 5 is a flowchart illustrating an example of a method of performing radiographic imaging according to the present exemplary embodiment and the method of driving the radiation imaging apparatus 1. The following steps S1010 and the like are performed mainly by the controller 17, and the controller 17 drives or controls the other components as necessary.

Steps S1010 to S1020 correspond to steps after activation of the radiation imaging apparatus 1 until a predetermined input is input by a user, and correspond to a so-called input waiting mode. Steps S1030 to S1040 correspond to steps to prepare the apparatus 1 to an imaging performable state in response to the above-described input from the user. Steps S1050 to S1090 correspond to steps to acquire image data of one frame in response to an imaging start command from the user. Steps S1100 to S1120 correspond to steps to acquire correction data for correction performed on the image data acquired in step S1050 to S1090. Step S1130 corresponds to a step to put the radiation imaging apparatus 1 into the input waiting mode until next radiographic imaging. The detail is described below with reference to FIG. 5.

For example, after the radiation imaging apparatus 1 receives the power supply voltage (the main power supply is turned on), the power supply circuit 16 supplies the voltage to some of the components in the apparatus 1 in step S1010. The power supply circuit 16 performs the switching control on the first and second voltage regulators 161 and 162 respectively based on the clock signals CLK2 and CLK4, thereby generating the voltage. Thereafter, in step S1020, it is determined whether an input intending to perform radiographic imaging or an input of information associated therewith has been performed by the user via, for example, the computer 4. When the input has not been performed (No in step S1020), the processing returns to step S1020 and the voltage generation based on the clock signals CLK2 and CLK4 is continued. Generally, a period until the above-described input is actually performed by the user is longer than a period necessary to perform the radiographic imaging once by the apparatus 1. Accordingly, the present exemplary embodiment is beneficial to reduction in power consumption.

On the other hand, when the input has been performed (YES in step S1020), the processing proceeds to step S1030, and start of the radiation irradiation is prepared (preparation operation $OP_{PR}$). The term "preparation" used herein indicates that the components for starting the radiation irradiation receive the corresponding voltages (the voltages generated respectively based on the clock signals CLK2 and CLK4 in this case) and are put into a substantially stationary state (a state satisfying a predetermined reference such as a state in which a deviation amount from a target value is within an allowable range). Although the detail is described below, in the present exemplary embodiment, the voltages generated based on the clock signals CLK2 and CLK4 are supplied to the readout circuit 13 and the output circuit 14, respectively, thereby putting each of the amplifiers A1 to A4 into a substantially stationary state. In the following description for the flowchart, completion of the preparation for starting the radiation irradiation is simply referred to as "preparation completion" in some cases. From a viewpoint of the user, it can be said that the reset operation $OP_{RS}$ described below is started upon the preparation completion and thus the radiation irradiation to the apparatus 1 has become ready to be started.

In step S1040, the reset operation $OP_{RS}$ is started. In the reset operation $OP_{RS}$, the sensor array 11 is reset in order to remove a dark current component (offset noise) that occurs in each of the sensors S with time. The reset operation $OP_{RS}$ is performed through driving of the switch devices W of the respective sensor S on a row basis at a predetermined period, which initializes the sensors S. During the reset operation $OP_{RS}$, in the readout circuit 13, the integrating amplifier A1 is maintained at a reset state when the reset switch is turned on. Accordingly, the signals output from the sensors S in the reset operation $OP_{RS}$ are not read out by the readout circuit 13 and are discarded. The reset operation $OP_{RS}$ is continued until before step S1070 described below (in other words, the sensors S are initialized at the predetermined period until before step S1070).

After the above-described preparation completion, i.e., in response to start of the reset operation $OP_{RS}$, the processing proceeds to step S1050, and the power supply circuit 16 starts generation of the voltage based on the clock signal CLK3 provided from the timing generator TG. In other words, the voltage generation through the switching control of the first voltage regulator 161 based on the clock signal CLK3 is started (the clock signal used for the switching control is changed from the clock signal CLK4 to the clock signal CLK3). Meanwhile, although the detail is described below, the second voltage regulator 162 continues the switching control based on the clock signal CLK2. In other words, the voltage that is generated by the switching control of the first voltage regulator 161 based on the clock signal CLK3 is supplied to the readout circuit 13, and the voltage that is generated by the switching control of the second voltage regulator 162 based on the clock signal CLK2 is supplied to the output circuit 14.

After the above-described preparation completion, i.e., in response to start of the reset operation $OP_{RS}$, the notification unit 15 (see FIG. 1) notifies the user of the preparation completion. This allows the user to recognize that radiation irradiation is enabled, and to input a start command of the radiation irradiation via the computer 4 at an optional time point after positional adjustment of a subject such as a patient to the apparatus 1 is completed.

In step S1060, whether the radiation irradiation has been started is determined. In the present exemplary embodiment, the controller 17 functions as a determination unit that determines whether the radiation irradiation has been started, and starts the determination after the above-described preparation completion. In the present exemplary embodiment, as described with reference to FIG. 2, the controller 17 determines, based on the detection result (i.e., variation of the current amount in the bias line $L_{VS}$) provided from the detection unit 18, whether the radiation irradiation has been started. More specifically, when the reset operation $OP_{RS}$ has been continued after step S1040 and the radiation irradiation has been started as described above, the amount of the current flowing through the bias line $L_{VS}$ varies. The detection unit 18 detects that the radiation irradiation has been started, based on the variation of the current amount. In such a configuration, when it is determined that the radiation irradiation has been started (YES in step S1060), the reset operation $OP_{RS}$ is interrupted and the processing proceeds to step S1070. When it is not determined that the radiation irradiation has been started (NO in step S1060), the processing returns to step S1060 while the reset operation $OP_{RS}$ is continued. In other words, the reset operation $OP_{RS}$ is continued until it is determined that the radiation irradiation has been started in step S1060, after the above-described preparation completion.

In step S1070, charge accumulation is performed in each of the sensors S of the sensor array 11 (charge accumulation operation $OP_{ACC}$) in response to determination of the start of the radiation irradiation. More specifically, the switch devices W of the respective sensors S are turned off for a predetermined period. This causes the charges of an amount corresponding to an irradiation amount of the radiation to be accumulated in the detection devices D of the respective sensors S.

In step S1080, whether the radiation irradiation has been ended is determined. In the present exemplary embodiment, it is assumed that the irradiation time of the radiation is previously set, and the processing proceeds to step S1090 after the irradiation time is elapsed. In other words, after it is determined that the radiation irradiation has been started, the charge accumulation operation $OP_{ACC}$ is continued until the preset irradiation time is elapsed. In another exemplary embodiment, the end of the radiation irradiation may be detected by the apparatus 1, and the processing may shift to readout operation $OP_{RO}$ described below in response to the detection of the end. In addition, in yet another exemplary embodiment, an integral value of the amount of the radiation irradiation (a time integral value) may be measured by the apparatus 1, a control signal for ending the radiation irradiation may be output based on a result of the measurement, and the processing may then shift to the readout operation $OP_{RO}$.

In step S1085, the voltage generation through the switching control of the second voltage regulator 162 based on the clock signal CLK1 is started (the clock signal used for the switching control is changed from the clock signal CLK2 to the clock signal CLK1). In other words, the output circuit 14 is supplied with the voltage that is generated by the switching control of the second voltage regulator 162 based on the clock signal CLK1. This causes the output circuit 14 to operate based on the voltage suppressed in voltage fluctuation.

In step S1090, the readout operation $OP_{RO}$ is performed. In the readout operation $OP_{RO}$, the sensor signals are read out from the respective sensors S of the sensor array 11. Since the output circuit 14 operates based on the voltage suppressed in voltage fluctuation by step S1085, the read sensor signals are appropriately output. Thereafter, image data is generated and acquired based on the read signals.

After the readout operation $OP_{RO}$, in step S1095, the voltage generation through the switching control of the second voltage regulator 162 based on the clock signal CLK2 is started (the clock signal used for the switching control is returned from the clock signal CLK1 to the clock signal CLK2). This reduces the power consumption.

Thereafter, in steps S1100 to S1120, the signals are read out from the respective sensors S while the radiation irradiation is not performed, and dark image data (offset data) not containing the signal component is acquired. As described above, the dark current components occur in the respective sensors S with time. Thus, the dark image data is acquired as correction data in steps S1100 to S1120 in order to perform correction of removing the dark current component from the image data acquired in step S1090.

Although the detail is described below, in step S1100, reset operation of the sensor array 11 (referred to as "reset operation $OP_{RS2}$" for discrimination) is performed over a period corresponding to the start time point of the radiation irradiation in step S1060, in a manner similar to the above-described reset operation $OP_{RS}$. In step S1110, charge accumulation is performed on the sensors S of the sensor array 11 (referred to as "charge accumulation operation $OP_{ACC2}$"

for discrimination), in a manner similar to the above-described charge accumulation operation $OP_{ACC}$. Thereafter, in step S1115, the voltage generation through the switching control of the second voltage regulator 162 based on the clock signal CLK1 is started, similar to step S1085. As a result, the output circuit 14 is supplied with the voltage that is generated through the switching control of the second voltage regulator 162 based on the clock signal CLK1. Thereafter, in step S1120, the sensor signals are read out from the respective sensors S of the sensor array 11 in a manner similar to the above-described readout operation $OP_{RO}$, and dark image data is acquired (referred to as "readout operation $OP_{RO2}$" for discrimination).

Finally, in step S1130, the clock signals used for the switching control of the first voltage regulator 161 and the second voltage regulator 162 are respectively returned to the clock signal CLK4 and the clock signal CLK2. In other words, the readout circuit 13 and the output circuit 14 are supplied with the voltages that are generated by the switching control of the first voltage regulator 161 and the second voltage regulator 162 based on the clock signal CLK4 and the clock signal CLK2, respectively. As a result, the power consumption is reduced again. For example, when the radiographic imaging is further scheduled, for example, when the information input in step S1020 instructs the radiographic imaging two or more times, step S1130 may be omitted.

Figure 6:
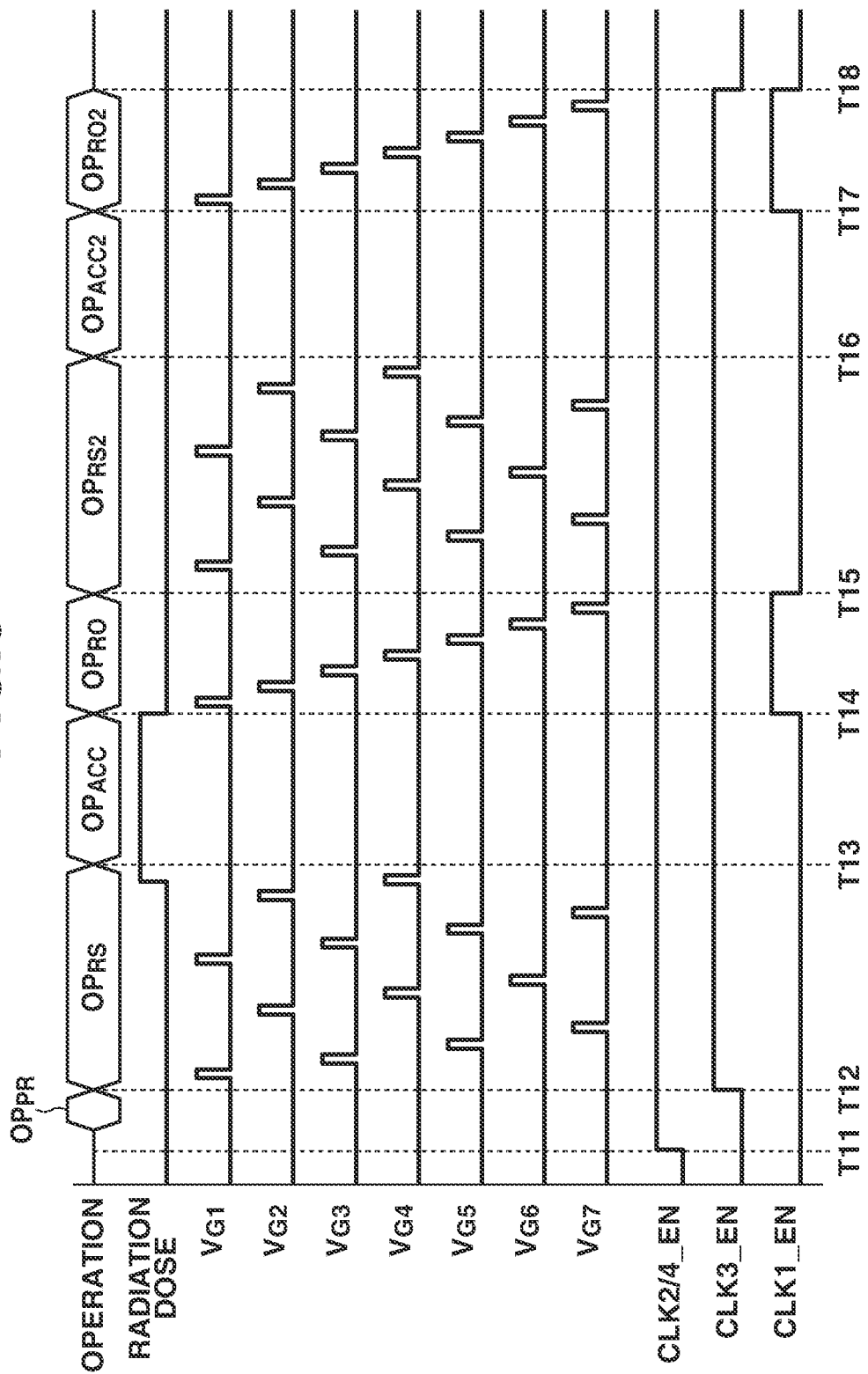
FIG. 6 is a timing chart illustrating an example of the method of driving the radiation imaging apparatus.

A specific form of the method of driving the radiation imaging apparatus 1 is described below with reference to a timing chart of FIG. 6. In FIG. 6, an axis of abscissae is a time axis and an axis of ordinates illustrates the operation state (the operation mode) of the apparatus 1, the radiation amount from the radiation source 2, the voltage $V_{G1}$ of the control line G1 and other voltages, and various kinds of enable signals (CLK2/4_EN, CLK3_EN, and CLK1_EN). Although the number of rows of the sensor array 11 is three (G1 to G3) in FIG. 2, the number of rows of the sensor array 11 is seven (G1 to G7) in FIG. 6 for description.

The enable signals CLK2/4_EN, CLK3_EN, and CLK1_EN are supplied to the power supply circuit 16 by the controller 17. The signal CLK2/4_EN is a signal to activate the switching control of the voltage regulators 161 and 162 based on the clock signals CLK4 and CLK2, respectively. The signal CLK3_EN is a signal to activate the switching control of the voltage regulator 161 based on the clock signal CLK3, and is an enable signal having priority over the signal CLK2/4_EN. The signal CLK1_EN is a signal to activate the switching control of the voltage regulator 162 based on the clock signal CLK1, and is an enable signal having priority over the signal CLK2/4_EN.

For example, in the case of the voltage regulator 161, the switching control of the voltage regulator 161 based on the clock signal CLK4 is performed when the signal CLK2/4_EN is at high level (H level) and the signal CLK3_EN is at low level (L level). For example, when both of the signal CLK2/4_EN and the signal CLK3_EN are at H level, the switching control of the voltage regulator 161 based on the clock signal CLK3 is performed. When both of the signal CLK2/4_EN and the signal CLK3_EN are at L level, the voltage regulator 161 is put into a pause state.

Similarly, in the case of the voltage regulator 162, the switching control of the voltage regulator 162 based on the clock signal CLK2 is performed when the signal CLK2/4_EN is at H level and the signal CLK1_EN is at L level. For example, when both of the signal CLK2/4_EN and the signal CLK1_EN are at H level, the switching control of the voltage regulator 162 based on the clock signal CLK1 is performed. When both of the signal CLK2/4_EN and the signal CLK1_EN are at L level, the voltage regulator 162 is put into a pause state.

In the present exemplary embodiment, the signals CLK2/4_EN, CLK3_EN, and CLK1_EN are all at L level before time T11 in FIG. 6.

A period from time T11 to time T12 corresponds to steps S1010 to S1030 described with reference to FIG. 5 (including the preparation operation $OP_{PR}$). When the signal CLK2/4_EN becomes H level at time T11, the switching control of the voltage regulators 161 and 162 respectively based on the clock signals CLK4 and CLK2 is performed. Thereafter, in the preparation operation $OP_{PR}$, the voltage generated by the switching control is supplied to the readout circuit 13 and the output circuit 14 by the power supply circuit 16, which completes the preparation.

A period from time T12 to time T13 corresponds to steps S1040 to S1060 (mainly, the reset operation $OP_{RS}$). In the present exemplary embodiment, the reset operation $OP_{RS}$ is performed by so-called interlace method. More specifically, reset for odd rows (G1, G3, G5, and G7) and reset for even rows (G2, G4, and G6) are repeatedly performed. In another exemplary embodiment, however, the reset operation $OP_{RS}$ may be performed by so-called progressive method (more specifically, in order of G1, G2, . . . , G7 (in order of a row number)).

As described above (see steps S1050 to S1060), it is determined whether the radiation irradiation has been started, together with the reset operation $OP_{RS}$. The determination is performed by the detection unit 18 based on variation of the current value of the bias line $L_{VS}$. When the signal CLK3_EN becomes H level at time T12 (i.e., at a time point before the time T12), the switching control of the voltage regulator 161 based on the clock signal CLK3 is started. As a result, the readout circuit 13 is supplied with the voltage generated by the switching control, and voltage fluctuation described with reference to FIGS. 4A and 4B is suppressed, which prevents false detection of the detection unit 18 in the present exemplary embodiment.

Since the signal CLK1_EN is still at L level during a period from time T12 to time T13, the switching control of the voltage regulator 162 based on the clock signal CLK2 is continued. The sensor signal is not read out and output to the outside in the reset operation $OP_{RS}$. Accordingly, according to the present exemplary embodiment, it is possible to prevent activation of the output circuit 14 to suppress power consumption. In addition, the output circuit 14 is disposed at the following stage of the readout circuit 13, and thus influence of the above-described voltage fluctuation to the sensor array 11 and the detection unit 18 is small.

When the detection unit 18 detects the start of the radiation irradiation (before time T13), the reset operation $OP_{RS}$ is interrupted and the processing shifts to the charge accumulation operation $OP_{ACC}$. In the present exemplary embodiment, it is assumed that the detection unit 18 detects the start of the radiation irradiation after the control line G4 (the voltage $V_{G4}$) provides a pulse at H level.

A period from time T13 to time T14 corresponds to step S1070 to S1050 (mainly, the charge accumulation operation $OP_{ACC}$). In the present exemplary embodiment, the irradiation time of the radiation is previously set. Accordingly, the period from time T13 to time T14 is fixed and the processing shifts to the readout operation $OP_{RO}$ after the irradiation time is elapsed.

A period from time T14 to time T15 corresponds to steps S1085 to S1095 (mainly, the readout operation $OP_{RO}$). Accordingly, the sensor signals are read out from the respective sensors S, and the image data is acquired. When the signal CLK1_EN becomes at H level at time T14 (i.e., at a time point before the time T14), the switching control of the voltage regulator 162 based on the clock signal CLK1 is started. As a result, the output circuit 14 is supplied with the voltage generated by the switching control and is activated. Thereafter, the sensor signals are read out with use of the readout circuit 13 and the output circuit 14 in the readout operation $OP_{RO}$, and the signal CLK1_EN is then changed to L level again at time T15. This makes it possible to suppress power consumption again.

In the present exemplary embodiment, the readout operation $OP_{RO}$ is performed by so-called progressive method. In addition, in the reset operation $OP_{RS}$ and the readout operation $OP_{RO}$, similar control is performed on each of the sensors S (the ON/OFF control of the switch device W in the present exemplary embodiment) except for whether the sensor signal is read out by the readout circuit 13.

A period from time T15 to time T16 corresponds to step S1100 (the reset operation $OP_{RS2}$). It is sufficient for the reset operation $OP_{RS2}$ to be performed similarly to the reset operation $OP_{RS}$ in the period from time T12 to time T13, and the reset operation $OP_{RS2}$ is interrupted at a time point similar to the reset operation $OP_{RS}$. In other words, in the present exemplary embodiment, the reset operation $OP_{RS2}$ is interrupted after the control line G4 (the voltage $V_{G4}$) provides the pulse of H level. This makes it possible to reduce difference of the dark current component between the image data obtained in the readout operation $OP_{RO}$ and the dark current data obtained thereafter, and to improve accuracy of the correction of removing the dark current component.

A period from time T16 to time T17 corresponds to step S1110 (the charge accumulation operation $OP_{ACC2}$). It is sufficient for the charge accumulation operation $OP_{ACC2}$ to be performed similarly to the charge accumulation operation $OP_{ACC}$ in the period from time T13 to time T14. The period from time T16 to time T17 is substantially equal to the period from time T13 to time T14.

A period from time T17 to time T18 corresponds to steps S1115 to S1130 (mainly, the readout operation $OP_{RO2}$). It is sufficient for the readout operation $OP_{RO2}$ to be performed similarly to the readout operation $OP_{RO}$ in the period from time T14 to time T15 except that the readout operation $OP_{RO2}$ is performed under the situation where the radiation is not emitted from the radiation source 2. This results in the dark image data.

Thereafter, the controller 17 performs the correction processing on the image data obtained in the readout operation $OP_{RO}$, based on the dark image data obtained in the readout operation $OP_{RO2}$.

As described above, according to the present exemplary embodiment, the power supply circuit 16 includes the two operation modes that are different in method of generating the supply voltage from each other. For example, one of the two clock signals CLK1 and CLK2 is selectively used for the switching control of the second voltage regulator 162. In the present exemplary embodiment, the clock signal CLK1 is supplied from the timing generator TG. The clock signal CLK2 is intermittently generated by the signal generation unit 163 in the power supply circuit 16, and has the frequency lower than the frequency of the clock signal CLK1. In such a configuration, the power consumption and the voltage fluctuation (the noise) have trade-off relationship between when the clock signal CLK1 is used and when the clock signal CLK2 is used (see FIGS. 4A and 4B). The above-described relationship is also applied to the clock signals CLK3 and CLK4 corresponding to the first voltage regulator 161.

The power supply circuit 16 uses the clock signal CLK3 to perform the switching control of the voltage regulator 161, thereby stably generating the voltage for the readout circuit 13 after the preparation for starting the radiation irradiation to the sensor array 11 is completed. Meanwhile, before the preparation completion, the power supply circuit 16 intermittently uses the clock signal CLK4 to perform the switching control of the voltage regulator 161, thereby generating the voltage for the readout circuit 13 with low power consumption. This makes it possible to appropriately achieve both of reduction in power consumption and suppression in voltage fluctuation. In particular, in the configuration of the present exemplary embodiment, it is possible to prevent false detection of the detection unit 18 caused by the voltage fluctuation after the preparation completion, which is beneficial to achieve appropriate radiographic imaging.

In the readout operation $OP_{RO}$ and $OP_{RO2}$, the power supply circuit 16 uses the clock signal CLK1 to perform the switching control of the voltage regulator 162, thereby stably generating the voltage for the output circuit 14. Meanwhile, in the operation other than the above, the power supply circuit 16 intermittently uses the clock signal CLK2 to perform the switching control of the voltage regulator 162, thereby generating the voltage for the output circuit 14 with low power consumption. This makes it possible to reduce the power consumption in the operation other than the readout operation $OP_{RO}$ and $OP_{RO2}$.

The state (the operation mode) of the component (the readout circuit 13 or the output circuit 14 in the present exemplary embodiment) may be represented according to the fact that the voltage supplied to the component is generated by the switching control based on which kind of clock signal. For example, the state in which a certain component is supplied with the voltage generated by the switching control based on the intermittent clock signal (for example, the clock signal CLK2) may be referred to as a waiting mode (or a sleep mode, a power saving mode, a power efficiency improved mode, or the like). A state in which the certain component is supplied with the voltage generated by the switching control based on the clock signal (for example, the clock signal CLK1) may be referred to as an activated mode (or a standby mode, a normal mode, or the like).

In the configuration of the present exemplary embodiment, the change time point of the clock signal (for example, from the clock signal CLK2 to the clock signal CLK1) used for the switching control of the voltage regulator 161 is not necessarily limited to the above-described form. For example, the detection operation by the detection unit 18 may be started (activated) after the reset operation $OP_{RS}$ is started. In this case, the change time point of the clock signal may be after the reset operation $OP_{RS}$ is started and before the detection operation by the detection unit 18 is started. In other words, it is sufficient for the clock signal to be changed after the preparation for starting the radiation irradiation is completed.

Further, in the present exemplary embodiment, the clock signal that is intermittently generated with relatively low frequency is described as the clock signal CLK2 (or CLK4). However, it is sufficient for the clock signal to achieve the low power consumption as compared with the clock signal CLK1 (or CLK3). Thus, the clock signal CLK2 (or CLK4) is not limited in waveform, amplitude, frequency, and the like to those described in the present exemplary embodiment. For example, the clock signal CLK2 (or CLK4) may be a continuous clock signal that has a frequency lower than the frequency of the clock signal CLK1 (or CLK3) (in other words, may not be an intermittent clock signal).

Figure 7:
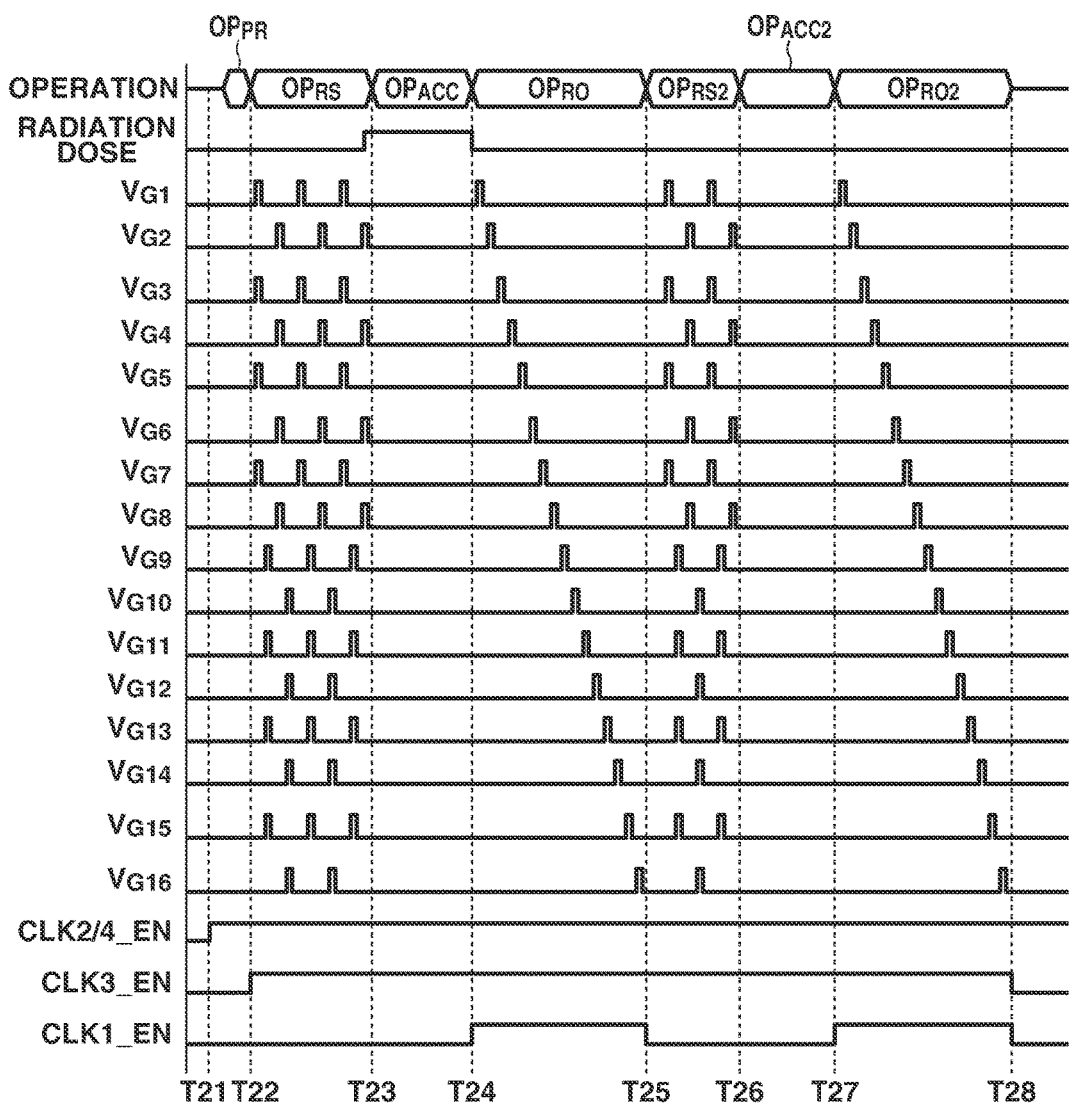
FIG. 7 is a timing chart illustrating an example of the method of driving the radiation imaging apparatus.

In a second exemplary embodiment described with reference to FIG. 7, mainly, the driving method in the reset operation $OP_{RS}$ and $OP_{RS2}$ is different from the driving method in the above-described first exemplary embodiment. In the first exemplary embodiment (see FIG. 6), the number of rows in the sensor array 11 is seven (G1 to G7). In the present exemplary embodiment, the number of rows is 16 (G1 to G16) for description. FIG. 7 illustrates a timing chart of the method of driving the radiation imaging apparatus 1 according to the present exemplary embodiment, as with FIG. 6. The contents of a period from time T21 to time T28 in FIG. 7 are similar to the contents of the period from time T11 to time T18 in FIG. 6.

In the first exemplary embodiment, the reset is performed on a row basis in the reset operation $OP_{RS}$ and $OP_{RS2}$. Meanwhile, in the present exemplary embodiment, the reset is performed on four rows basis. More specifically, in the reset operation $OP_{RS}$, the sensors S in the first, third, fifth, and seventh rows (G1, G3, G5, and G7) are reset at a time. Next, the sensors S in the ninth, 11th, 13th, and 15th rows (G9, G11, G13, and G15) are reset at a time. Thereafter, the sensors S in the second, fourth, sixth, and eighth rows (G2, G4, G6, and G8) are reset at a time. Further, the sensors S in the 10th, 12th, 14th, and 16th rows (G10, G12, G14, and G16) are reset at a time. The above-described series of operation corresponds to reset for one scanning, and the operation is repeated in the present exemplary embodiment.

According to the present exemplary embodiment, it is possible to reduce the time for the reset for one scanning, which is beneficial to upsizing of the sensor array 11. The upsizing of the sensor array 11 increases the total capacity of the capacity component C_CP (see FIG. 3), and influence of the voltage fluctuation (see FIGS. 4A and 4B) by the capacitive coupling is increased. Accordingly, also in the present exemplary embodiment, one of the clock signals CLK1 and CLK2 and one of the clock signals CLK3 and CLK4 are selectively used in consideration of both of reduction in power consumption and suppression in voltage fluctuation. The present exemplary embodiment is beneficial to upsizing of the sensor array 11, and makes it possible to achieve effects similar to the effects by the above-described first exemplary embodiment.

The aspect of the disclosure may be realized by one or more processors in a computer of a system or an apparatus performing processing of reading and executing a program for achieving one or more functions of the above-described exemplary embodiments supplied to the system or the apparatus via a network or a storage medium. For example, the aspect of the embodiments may be realized by a circuit (for example, an ASIC) that achieves one or more functions.

Some exemplary embodiments have been described above. However, the disclosure is not limited to the above exemplary embodiment, and may be partially modified without departing from the scope of the disclosure. Further, the individual terms described in the present specification are merely used for description of the aspect of the embodiments, and the aspect of the embodiments is not limited to the restrict meanings of the terms and includes the equivalents thereof.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2016-229189, filed Nov. 25, 2016, which is hereby incorporated by reference herein in its entirety.

What is claimed is:

1. An apparatus comprising:
a sensor array in which a plurality of sensors each configured to detect radiation is arranged;
a readout circuit configured to read out a signal from the plurality of sensors;
an output circuit configured to output the signal;
a driving unit configured to drive the plurality of sensors;
a controller configured to perform first control for resetting the plurality of sensors by causing the driving unit to drive the plurality of sensors before start of radiation irradiation, second control for causing the driving unit to accumulate charges in the plurality of sensors after the start of the radiation irradiation, and third control for causing the driving unit to drive the plurality of sensors to cause the output circuit to output the signal after the second control; and
a power supply circuit including a first switching voltage regulator that generates a voltage for the readout circuit and a second switching voltage regulator that generates a voltage for the output circuit,
wherein the second voltage regulator generates the voltage for the output circuit based on a first clock signal provided from the controller in the third control, and generates the voltage for the output circuit based on a second clock signal in the first control, the second clock signal being lower in power consumption of the second voltage regulator than the first clock signal, and
wherein the first voltage regulator generates the voltage for the readout circuit based on a third clock signal provided from the controller in the first control, the second control, and the third control.

2. The apparatus according to claim 1, wherein the first voltage regulator generates the voltage for the readout circuit based on a fourth clock signal before the first control and/or after the third control, the fourth clock signal being lower in power consumption of the first voltage regulator than the third clock signal.

3. The apparatus according to claim 2,
wherein the second clock signal has a frequency lower than a frequency of the first clock signal, and
wherein the fourth clock signal has a frequency lower than a frequency of the third clock signal.

4. The apparatus according to claim 2, wherein the first voltage regulator changes a clock signal used to generate the voltage for the readout circuit from the fourth clock signal to the third clock signal in response to start of the first control.

5. The apparatus according to claim 2, wherein the second voltage regulator generates the voltage for the output circuit based on the second clock signal in the second control.

6. The apparatus according to claim 2,
wherein the first voltage regulator alternately performs operation of repeating switching of the first voltage regulator based on the fourth clock signal and operation of stopping the switching, before the first control, and
wherein the second voltage regulator alternately performs operation of repeating switching of the second voltage regulator based on the second clock signal and operation of stopping the switching, before the first control, in the first control, and in the second control.

7. The apparatus according to claim 2,
wherein the fourth clock signal is intermittently generated by the first voltage regulator, and
wherein the second clock signal is intermittently generated by the second voltage regulator.

8. The apparatus according to claim 2, wherein the power supply circuit further includes a signal generation unit that intermittently generates the second clock signal and the fourth clock signal.

9. The apparatus according to claim 7,
wherein the first voltage regulator generates the voltage for the readout circuit based on the fourth clock signal before the first control, and
wherein the second voltage regulator generates the voltage for the output circuit based on the second clock signal before the first control, in the first control, and in the second control.

10. The apparatus according to claim 2, wherein the controller changes the clock signal used for the switching control of the first voltage regulator from the fourth clock signal to the third clock signal in response to the start of the first control, and changes the clock signal used for the switching control of the second voltage regulator from the second clock signal to the first clock signal in response to start of the third control.

11. The apparatus according to claim 1, further comprising a determination unit configured to determine whether the radiation irradiation has been started,
wherein the determination unit performs the determination in the first control.

12. The apparatus according to claim 11, further comprising a bias line configured to supply a reference voltage to the sensor array,
wherein the determination unit performs the determination based on a signal of the bias line.

13. The apparatus according to claim 1, further comprising a notification unit configured to notify a user that the radiation irradiation has become ready to be started, after start of the first control.

14. A system comprising:
   the radiation imaging apparatus according to claim 1; and
   a radiation source configured to generate radiation.

* * * * *